United States Patent [19]

Shojima et al.

[11] Patent Number: 4,718,103
[45] Date of Patent: Jan. 5, 1988

[54] METHOD AND APPARATUS FOR ON-LINE RECOGNIZING HANDWRITTEN PATTERNS

[75] Inventors: Hiroshi Shojima; Toshimi Mifune; Junko Mori, all of Hitachi; Soshiro Kuzunuki, Katsuta, all of Japan

[73] Assignee: Hitachi, Ltd., Tokyo, Japan

[21] Appl. No.: 914,071

[22] Filed: Oct. 1, 1986

[30] Foreign Application Priority Data

Oct. 8, 1985 [JP] Japan .................. 60-222816

[51] Int. Cl.4 ............................. G06K 9/62
[52] U.S. Cl. ........................ 382/13; 382/3; 382/21
[58] Field of Search ............. 382/13, 21, 3, 60, 22

[56] References Cited

U.S. PATENT DOCUMENTS

| | | | |
|---|---|---|---|
| 3,609,685 | 9/1971 | Deutsch | 382/21 |
| 3,942,169 | 3/1976 | Fujimoto et al. | 382/21 |
| 4,542,412 | 9/1985 | Fuse et al. | 382/13 |
| 4,597,101 | 6/1986 | Kishimoto et al. | 382/13 |
| 4,646,351 | 2/1987 | Asbo et al. | 382/13 |
| 4,653,107 | 3/1987 | Shojima et al. | 382/3 |

FOREIGN PATENT DOCUMENTS 0151316  8/1985  European Pat. Off. .
60-169983  9/1985  Japan .

Primary Examiner—Leo H. Boudreau
Assistant Examiner—Steven Brim
Attorney, Agent, or Firm—Antonelli, Terry & Wands

[57] ABSTRACT

A handwritten pattern approximated to a series of polygonal lines consisting of segments is compared with a candidate pattern selected from dictionary patterns stored in the memory, basing on the angular variation between adjacent segments of both patterns. If the difference between angular variations of adjoining segments of both patterns is outside of a certain range, it is tested whether the difference between an angular variation across three or more consecutive segments and the above reference angular variation is within the range.

11 Claims, 10 Drawing Figures

F I G. 4a
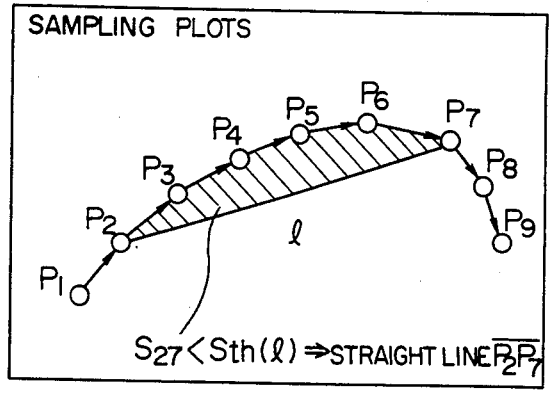
F I G. 4b
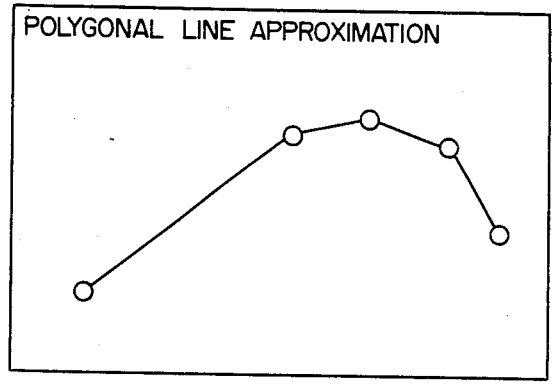

F I G. 5a
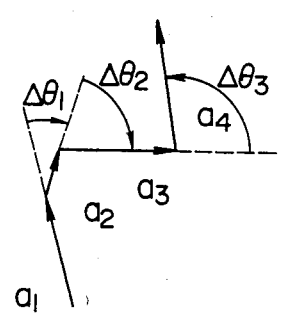
F I G. 5b
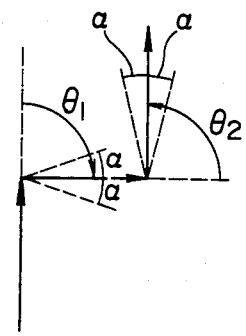

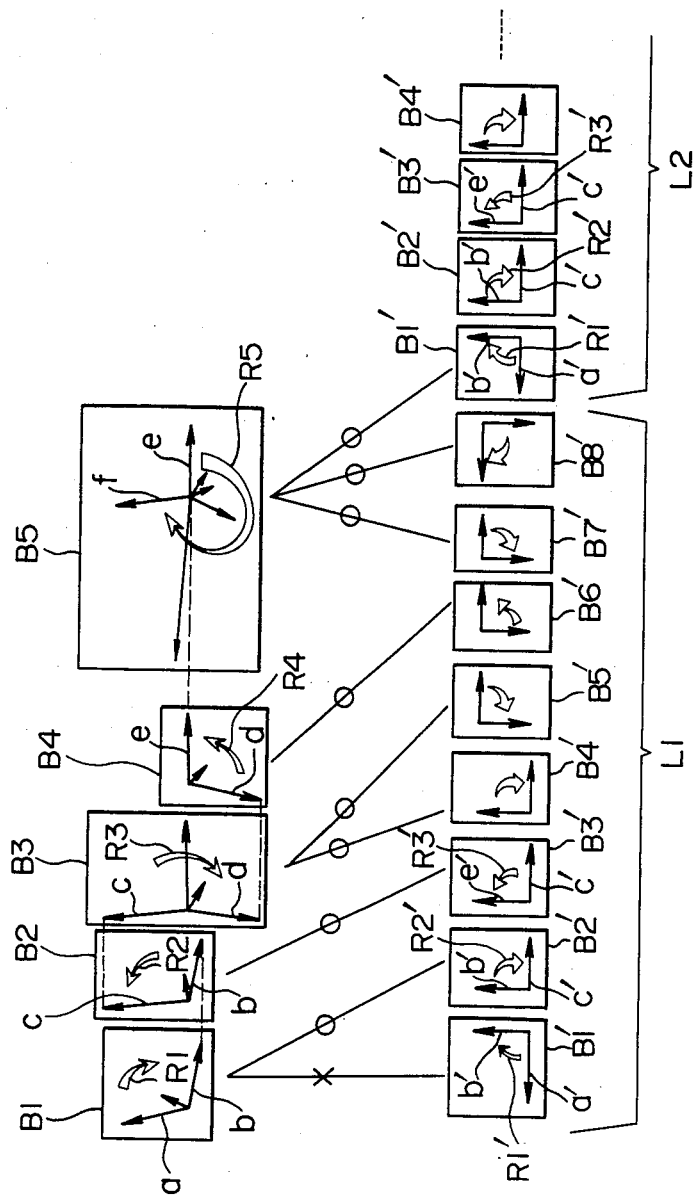

METHOD AND APPARATUS FOR ON-LINE RECOGNIZING HANDWRITTEN PATTERNS

CROSS-REFERENCE TO RELATED APPLICATION

This invention is related to U.S. patent application Ser. No. 686,001 filed on Dec. 24, 1984 now U.S. Pat. No. 4,653,107 assigned to the same assignee.

BACKGROUND OF THE INVENTION

This invention relates to a method and apparatus for ON-LINE recognizing handwritten patterns and, particularly, to a method and apparatus for ON-LINE recognizing handwritten patterns which are liable to variation and rotation.

A conventional handwritten pattern recognition system operates in such a way that each handwritten stroke is divided into numerous short vectors and it is tested whether part or all of the vectors match the majority of vectors of a candidate pattern in the dictionary, as described in an article entitled "Application of DP Matching Process to Character Recognition", Nikkei Electronics, pp. 198–199, Nov. 7, 1983. This method is capable of character recognition even if the dimension of the input vectors differs from that of the dictionary vectors and is advantageous in recognizing correct-attitude handwritten patterns. However, because of the comparison process based on the direction of each vector, when a rotated character is entered, which results in a change in the direction of each vector, it becomes difficult to recognize the character, and therefore the method could not readily be applied directly to pattern recognition where the rotation of pattern occurs frequently.

There has been proposed another handwritten pattern recognition system operating in such a way that a handwritten pattern is decomposed into a plurality of segments, comparison is carried out between angular variations of adjoining segments and the counterpart of a candidate pattern stored in the dictionary to evaluate the difference between them, and the entered handwritten pattern is recognized depending on the degree of difference as disclosed in U.S. patent application Ser. No. 686,001 now U.S. Pat. No. 4,653,107. However, this method is entirely based on the comparison of the angular variations of adjoining segments between an input handwritten pattern and candidate patterns in the dictionary, and therefore it cannot deal with input handwritten patterns which are rich in variation. Namely, in FIG. 1a, an input handwritten pattern is approximated to segments a1, a2 and b, and adjoining segment pairs a1-a2 and a2-b have angular variations $\Delta\theta 1$ and $\Delta\theta 2$, respectively. In the recognition process, the input handwritten pattern of FIG. 1a, which is pertinent to a dictionary pattern shown in FIG. 1b, the angular variation $\Delta\theta 1$ between the adjoining segments a1 and a2 of FIG. 1a is compared with the angular variation $\theta$ between the adjoining segments a' and b' in FIG. 1b, resulting occasionally in a judgement of inconsistency. The presence of the segment a2 in FIG. 1a is a result of a significant variation in the input handwritten pattern, and for a reasonable pattern recognition process, the angular variation across the three consecutive segments a1, a2 and b (i.e., $\Delta\theta 1 + \Delta\theta 2$) should be compared with the angular variation between the adjoining segments a' and b' of the dictionary pattern shown in FIG. 1b.

SUMMARY OF THE INVENTION

This invention is intended to overcome the foregoing prior art deficiency, and its prime object is to provide a method and apparatus for recognizing handwritten patterns operative to correctly recognize even rotated handwritten patterns and variations of patterns.

Generally, a pattern can be defined by a group of segments and their linkage relationship. It is not easy for hand-writing to draw a complete straight line and arc, and the ambiguity of hand-writing creates unnecessary segments, resulting generally in an increased number of segments.

The inventive handwritten pattern recognition system operates in such a way that a handwritten pattern is decomposed into a series of segments and the angular variation between adjoining segments, in consideration of the angular variation across three or more segments, is compared with the angular variation between adjoining segments of a candidate dictionary pattern, and the ambiguity of hand-writing is overcome and correct pattern recognition is made possible. In the angular variation comparing process, the starting segment of a dictionary pattern is shifted sequentially, which allows recognition of a rotated handwritten pattern.

BRIEF DESCRIPTION OF THE DRAWINGS

FIGS. 4a and 4b are diagrams explaining the process of approximating an input handwritten pattern to polygonal lines;

FIGS. 5a and 5b are diagrams explaining the polygonal line approximation for an input handwritten pattern and a pertinent dictionary pattern, respectively;

FIG. 7 is a diagram showing an example of the matching decision process for an input handwritten pattern and a dictionary pattern.

DESCRIPTION OF THE PREFERRED EMBODIMENTS

The present invention will now be described in detail with reference to the accompanying drawings.

Figure 1A:
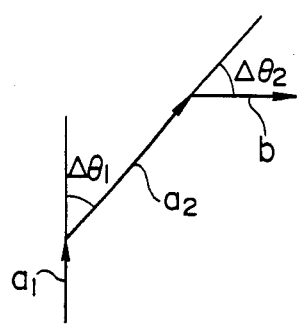
FIGS. 1a and 1b are diagrams explaining a typical relationship between an input handwritten pattern and a pertinent dictionary pattern.
Figure 1B:
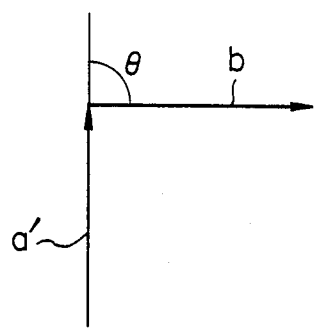
Figure 2:
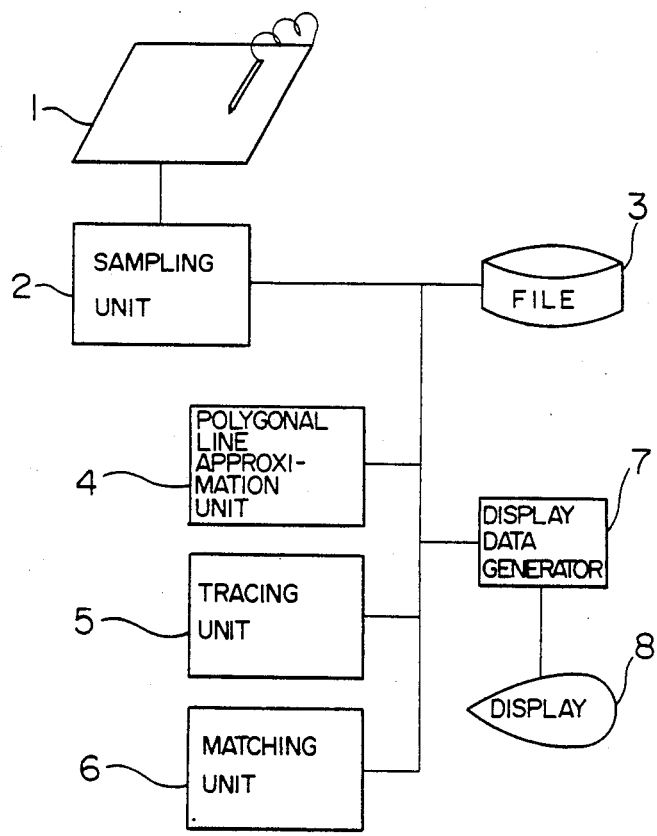
FIG. 2 is a block diagram of the handwritten pattern recognition system embodying the present invention.

In FIG. 2 showing in block diagram an embodiment of this invention, strokes of a pattern written by hand on a tablet 1 are sampled periodically by a sampling unit 2 and converted into plots on the 2-dimensional coordinates. The plots are stored temporarily in a file 3. A polygonal line approximation unit 4 reads out the plots in the file 3, eliminates intermediate plots residing on straight line segments so that the strokes are approximated to groups of polygonal lines, and they are stored in the file 3. A tracing unit 5 traces in a certain direction the sequence of the polygonal lines read out of the file 3 to produces a series of segments, and stores the result in the file 3. A matching unit 6 reads out the series of input segments and a series of reference segments from the file 3, and makes decision for the consistency or inconsistency between both series of segments. If the consistency has resulted, a display data generating unit 7 produces a clean pattern for the recognized input pattern, and operates on a display unit 8 to display it.

Next, each of the above processing steps will be described in detail with reference to FIGS. 3, 4 and 5.

Figure 3:
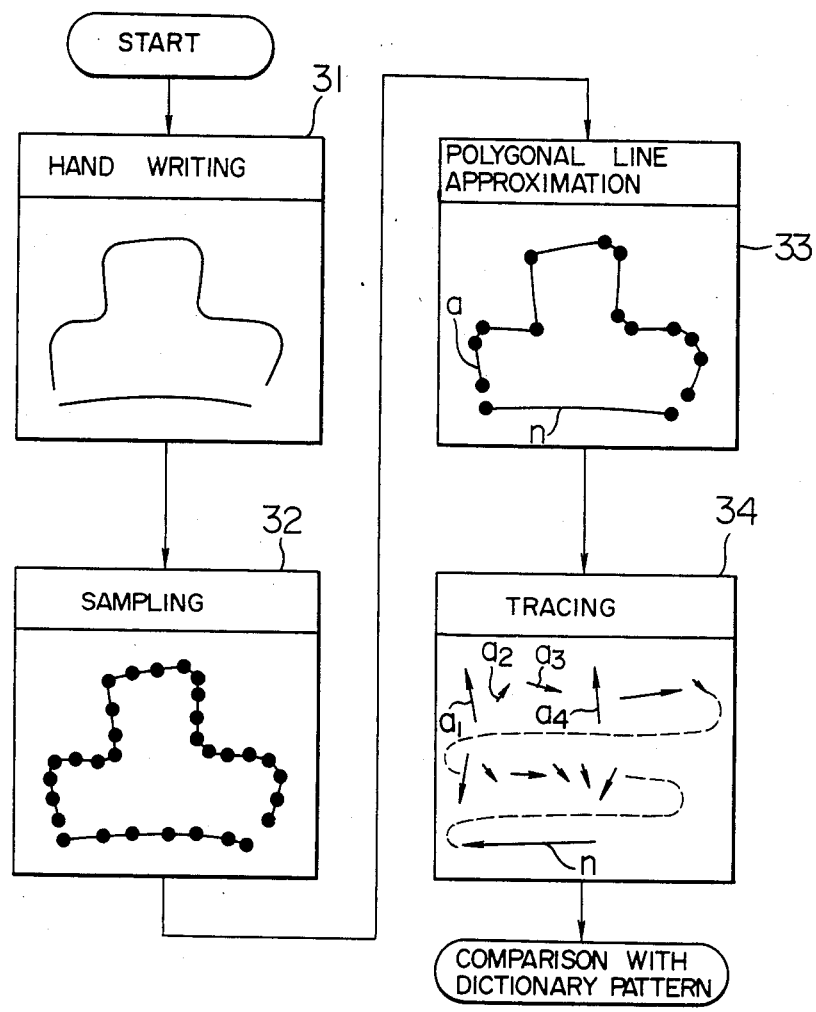
FIG. 3 is a diagram explaining the operation of the system shown in FIG. 2.

FIG. 3 shows in flowchart the sequential operations implemented by the tablet 1 through tracing unit 5 in FIG. 2. Initially, in step 31, handwritten strokes as shown are entered through the tablet 1. The entered handwritten strokes are sampled at a speed of 100 points per second, for example, by the sampling unit 2 in FIG. 2 so that a series of plots as shown are formed on the coordinates in step 32. In the subsequent step 33, the sampled plots are rendered polygonal approximation, as shown, by the polygonal approximation unit 4 in FIG. 2. The polygonal approximation takes place as shown in FIG. 4a in such a way that a chord l connecting two points P2 and P7 is specified and then the area S27 enclosed by the chord l and the polygonal lines P2 through P7 is calculated. If the area S27 is smaller than the threshold value Sth(l) which is a function of the chord l, i.e., S27<Sth(l), the curve connecting the two points P2 and P7 is approximated to a straight line. Conversely, if the area S27 is larger than the threshold value Sth(l), i.e., S27>Sth(l) the point S7 is replaced with point P6 so that the distance from the point P2 decreases and the above process is repeated, and eventually a polygonal approximation as shown in FIG. 4b is reached. The example shown in FIG. 3 will result in a polygonal approximation as shown in step 33 of FIG. 3. In the subsequent step 34, the result of polygonal approximation is processed by the tracing unit 5, and the polygonal lines are converted into segments. Namely, the polygonal lines are traced starting with segment a up to the last segment n in a certain direction (e.g., clockwise direction), and a set of segments as shown is produced.

The operation of the matching unit 6 for comparing a series of input segments obtained in step 34 with a series of reference segments in the dictionary is as follows. In the matching process, the angular variation between two adjoining segments is used as a characteristic value for comparison. For example, the initial four segments a1, a2, a3 and a4 shown in step 34 of FIG. 3 yield the angular variations shown in FIG. 5a. FIG. 5b shows a set of reference segments of part of the dictionary pattern pertinent to the input segments. The matching process compares the input angular variations $\Delta\theta_1$, $\Delta\theta_2$ and $\Delta\theta_3$ yielded by the input segments derived from the polygonal lines which approximate the handwritten pattern with the angular variations $\theta_1$ and $\theta_2$ for the segments derived from the corresponding portion of a candidate pattern in the dictionary.

Figure 6:
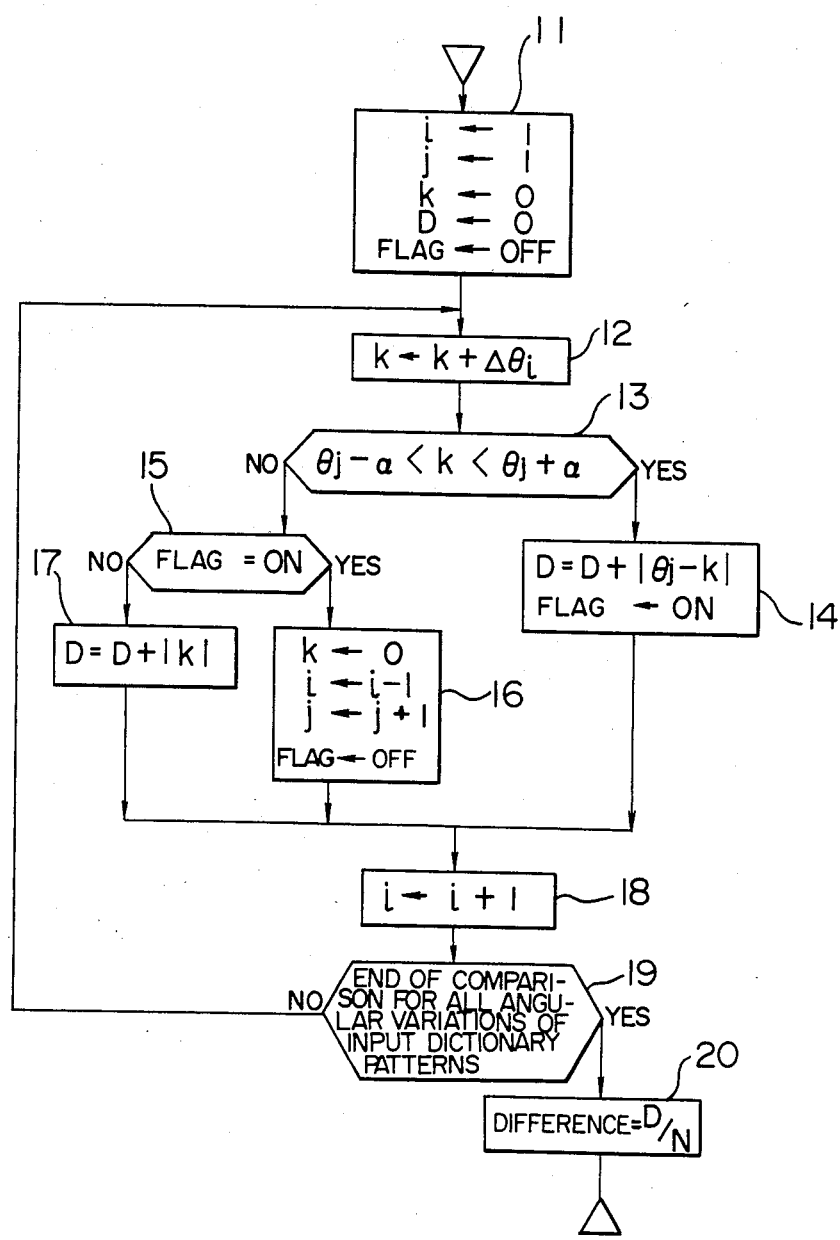
FIG. 6 is a flowchart showing the handwritten pattern recognition method according to this invention.

In FIG. 6 showing in flowchart the above matching process, step 11 sets the variables i and j to "1", sets the sum of angular variations, K, to "0", sets the degree of partial difference D, to "0", and resets the flag which indicates the comparison result to be within a certain range. The subsequent step 12 adds the input angular variation $\Delta\theta_i$ to the summed angular variation K. Since the summed angular variation K and variable i have been initialized to "0" and "1" respectively, in step 11, the operation of the first cycle yields $K=\Delta\theta_1$.

The subsequent step 13 tests whether the summed input angular variation K is within the range of the reference angular variation $\theta_j$ plus/minus $\alpha$, where $\alpha$ is preset to a value which is a quarter of the reference angular variation $\theta_j$, for example. If the test result in affirmative, i.e., K is within $\theta_j \pm\alpha$, the subsequent step 14 sets the flag indicative of "in-range" and calculates the partial difference D. The partial difference D is calculated by adding the absolute value of the difference between the input angular variation $\Delta\theta_i$ and the summed input angular variation K to the previous partial difference D, and it provides an estimation value indicative of the degree of variation of a handwritten character. Conversely, if the step 13 provides a negative test result, i.e., K is outside the range $\theta_j \pm\alpha$, the subsequent step 15 tests whether the flag has been set in the operation of the previous cycle. If the flag is found reset, step 17 updates the partial difference D by adding the summed angular variation K to the partial difference D of the previous cycle. Namely, adjustment is made such that the more the number of unnecessary input segments, i.e., the more the number of adding operations for angular variations, the greater partial difference will result. If, on the other hand, the flag is found set in step 15, the summed regular variation K is reset to zero, the variables i and j are decremented and incremented by one, respectively, and the flag is reset. The variable i is incremented by one in step 18, and a new angular variation $\theta_j$ of the dictionary pattern is retrieved through the above operations and compared with the last input angular variation $\Delta\theta_i$ outside the range.

Step 19 tests whether checking for at least one of input angular variations and dictionary angular variations is completed, and, if it is affirmative, step 20 divides the partial difference D by the number of dictionary segments, N, so as to evaluate the final difference.

Next, the matching process for the case shown in FIGS. 5a and 5b will be described with reference to the following table 1.

TABLE 1

| Item | Processing | Process step |
|------|------------|--------------|
| 1 | $K(=\Delta\theta_1)<(\theta_1-\alpha)$ | 12, 13 |
| 2 | Reset flag. $D=D+|K|$ | 15, 17 |
| 3 | $(\theta_1-\alpha)<K(=\Delta\theta_1+\Delta\theta_2)<(\theta_1+\alpha)$ | 12, 13 |
| 4 | $D=D+|\theta_1-K|$; set flag. | 14 |
| 5 | $K (=\Delta\theta_1+\Delta\theta_2+\Delta\theta_3)<(\theta_1-\alpha)$ Set K to "0", reset flag; set i to "3", set j to "2" | 13, 15, 18 |
| 6 | $(\theta_2-\alpha)<K(=\Delta\theta_3)<(\theta_2+\alpha)$ | 12, 13 |
| 7 | $D=D+|\theta_2-K|$, set flag | 14 |
| ⋮ | ⋮ | ⋮ |

An item 1, the reference angular variation $\theta_1$ and input angular variation $\Delta\theta_1$ are taken out, and it is found that the summed input angular variation K, which is $\Delta\theta_1$ at this time, is smaller than $\theta_1-\alpha$ (step 13). Next, at item 2, the flag is left reset so as to indicate that the input angular variation $\theta_1$ is outside the specified range, and the partial difference D is made equal to K (i.e., $\Delta\theta_1$). At the next item 3, the total input angular variation K is made equal to $\Delta\theta_1+\Delta\theta_2$, and it is found that the summed input angular variation K is within the specified range. At item 4, the flag is set and at the same time $|\theta_1-K|$ is added to the partial difference D so as to produce a new partial difference D. At the next item 5, the summed input angular variation K is made equal to $\Delta\theta_1+\Delta\theta_2+\Delta\theta_3$, and it is found that this value is out of the specified range, with the flag being reset and the summed input angular variation K being reset to zero. At the next item 6, a new reference angular variation $\theta_2$ is taken, a new summed input angular variation K is made equal to $\Delta\theta_3$, and it is found that the value K is within the specified range. At the next item 7, the flag is set and the partial difference D is updated.

In the example shown in FIGS. 5a and 5b, it is found that the input $\Delta\theta 1$ and $\Delta\theta 2$ correspond to the reference angular variation $\theta 1$, and the matching process is obviously possible even if an input pattern and a dictionary pattern have different numbers of segments. This is a clear distinction of the present invention from the U.S. patent application Ser. No. 686,001.

Generally, a handwritten pattern may be entered in a rotated attitude, and therefore it will be effective to repeat the steps 11 through 20 shown in FIG. 6 while shifting the starting angular variation of the dictionary pattern one by one.

FIG. 7 shows an example of correspondence between segments of an input pattern and segments of a dictionary pattern. The input segment varies from segment a to b to c and so one, with the direction of angular variation (clockwise or counterclockwise) being indicated by the arrows R1, R2, R3, R4 and R5. Similarly, the dictionary segment varies from segment a' to b' to c' and so on, with the direction of angular variation being indicated by the arrows R1', R2', R3' and so on. The dictionary segment sets L1 and L2 are the same, and they are provided with the intention that the recognition process will complete until the last block of L2 even if the input pattern has begun to yield a matching result at an intermediate block of L1.

The following describes the process in more detail. In FIG. 7, block B1 of the input pattern and block B1' of the dictionary candidate pattern, each showing an angular variation, have their angular variations in the same direction as shown by the arrows R1 and R1', and therefore the matching process can be commenced with the tie of blocks B1 and B1'. Once the matching process for the blocks B1 and B1' has been commenced, however, the subsequent blocks B2 and B2' reveal angular variations in opposite directions as shown by the arrows R2 and R2', and it is found that the blocks B2 and B2' do not match each other. Accordingly, it is found to be impossible for the input segments a, b, c and so on to reach a matching result through the commencement of the matching process from block B1', i.e. segment a', of the dictionary candidate pattern. Symbol "x" in the figure indicates the failure of matching between segments of both patterns.

The next trail of matching process for the block B1 of the input pattern is to commence with block B2' of the dictionary candidate pattern. The blocks B1 and B2' have their angular variations in the same direction as indicated by the arrows R1 and R2', and the result of matching is reached. Comparing the subsequent blocks B2 and B3' reveals that their angular variations are in the same direction, and these segments match each other. In the same way, ties of blocks B3 and B4', blocks B3 and B5', blocks B4 and B6', blocks B5 and B7', blocks B5 and B8', and blocks B5 and B1' (in dictionary segment set L2) for all corresponding combinations of the input segments and dictionary segments reach the result of matching. In order for an input pattern to be identified to be a candidate pattern in the dictionary, it is necessary that the number of blocks counted from the block of the dictionary sequent set at which the recognition process has commenced (block B2' of dictionary segment set L1 in the above example) up to the ending block (block B1' of dictionary segment set L2 in the above example) is equal to the number of blocks which constitute the candidate pattern in the dictionary. In the above example, the dictionary candidate pattern consists of eight blocks B1'-B8', equal in number to the blocks from the recognition commencement to the end, and it means that character recognition may have been possibly implemented correctly. However, there may exist more than one candidate pattern equal in the number of blocks to the input pattern, and therefore an input pattern cannot be recognized to be a candidate pattern merely basing on the equality of the number of blocks. In such cases, the matching process is conducted for all candidate patterns having the same number of blocks as of the input pattern so that their ultimate differences are evaluated. Then, among all a candidate pattern with the minimal ultimate difference is selected to be the result of recognition for the input pattern. If the numbers of blocks are not equal, the input character is not proved to be recognized accurately even if the matching process for each block tie provides a successful result.

Although the foregoing embodiment is of the case of character recognition basing merely on the angular variation of the input segment set and dictionary segment set, the present invention is not confined to this scheme, but the recognition process may further deal with an additional parameter $\beta$ indicative of the length of adjacent segments of a character so as to more clarify the feature of each character. In this case, polygonal lines which approximate an input pattern not only provide angular variations of adjacent segments, but also provide ratios of lengths of adjacent segments. For example, instead of the summed angular variation K shown in FIG. 6, an estimation function of $K \times \beta$, where $\beta$ is the abovementioned parameter, is preferably employed.

In addition, it will be appreciated that the matching process for the input and candidate patterns may be preceded by the calculation of the number of blocks which indicate the angular variation directions of an input pattern as shown by B1-B5 in FIG. 7 and the selection of candidate patterns having the same number of blocks as calculated among dictionary patterns.

As described above, the inventive handwritten pattern recognition method and apparatus are capable of correct pattern recognition even for deformed or rotated handwritten patterns.

We claim:

1. A method of recognizing handwritten patterns comprising the steps of:
    (a) sampling strokes of a handwritten pattern to produce a series of sampled plots on a plane of coordinates;
    (b) segmenting the series of sampled plots to a series of polygonal lines, which approximate the handwritten pattern, consisting of segments;
    (c) evaluating the angular variation between adjoining segments by tracing the series of polygonal lines in a certain direction so as to determine a series of input angular variation values;
    (d) reading out a candidate pattern from a dictionary storage which stores a plurality of dictionary patterns, each of which is expressed in terms of a series of reference angular variation values determined as angular variations of adjoining segments by tracing the series of segments of the pattern in said direction;
    (e) comparing an input angular variation value selected from said series of input angular variation values with a reference angular variation value selected from said series of reference angular variation values;

(f) if the comparison result is outside of a certain range, adding input angular variation values of said series of input angular variation values to the selected input angular variation value one by one so that the comparison result is inside of said range;

(g) if the comparison result in step (e) or (f) is inside of said range, determining a partial difference between the input pattern and the candidate pattern in accordance with the comparison result, and thereafter repeating said steps (e), (f) and (g) for comparing a next input angular variation value selected from said series of input angular variation values with a next reference angular variation value selected from said series of reference angular variation values; and (h) determining an ultimate difference between the input pattern and the candidate pattern upon completion of comparison for at least one of said series of input angular variation values and said series of reference angular variation values.

2. A pattern recognition method according to claim 1 further comprising the steps of:

(i) repeating said steps (d) through (h) for reading out another candidate pattern from said dictionary storage; and (j) determining a candidate pattern which provides a minimal ultimate difference to be a recognized pattern for the input pattern.

3. A pattern recognition method according to claim 1, wherein said step (g) comprises the substeps of:

(i) after said partial difference has been determined, adding input angular variation values of said series of angular variation values one by one to said input angular variation value to be compared so that the comparison of the summed input angular variation value with the reference angular variation value falls outside of said range; and (ii) if the comparison result is outside of said range, repeating said steps (e), (f) and (g).

4. A pattern recognition method according to claim 1, wherein said ultimate difference is determined from the ratio of a sum of the partial differences to the number of angular variation values of said series of reference angular variation values.

5. A pattern recognition method according to claim 1, wherein said partial difference is renewed in accordance with said summed input angular variation value at each adding operation in said step (f).

6. A pattern recognition method according to claim 1, wherein said input angular variation value and reference angular variation value have polarities indicative of the direction of angular variation.

7. A pattern recognition method according to claim 6, wherein said range extends by a quarter of a selected reference angular variation to the positive side and negative side of the selected reference angular variation value.

8. A handwritten pattern recognition apparatus comprising:

sampling means which samples strokes of a handwritten pattern to produce a series of plots on a plane of coordinates;

segmentation means connected to said sampling means and adapted to convert the series of plots to a series of polygonal lines, which approximate the input pattern, consisting of segments;

means connected to said segmentation means and adapted to produce a series of input angular variation values, each representing an angular variation between adjoining segments, by tracing the series of polygonal lines in a certain direction starting with an end of an arbitrary segment;

means for memorizing a plurality of reference patterns in the form of a series of reference angular variation values, each representing an angular variation value between adjoining segments, by tracing segments of each pattern in said direction; and pattern recognition means connected to said input angular variation producing means and said memorizing means and adapted to compare an input angular variation value selected from said series of input angular variation values with a reference angular variation value selected from said series of reference angular variation values of a candidate pattern retrieved from said memorizing means so as to determine a partial difference between said input pattern and said candidate pattern when the comparison result is within a certain range, said pattern recognition means comparing a sum of two or more input angular variation values derived from said series of input angular variation values with the selected reference angular variation value when the comparison result is outside of said range, and calculating an ultimate difference between the input pattern and the candidate pattern based on a sum of partial difference upon completion of comparison for all angular variation values of at least one of said series of input angular variation values and said series of reference angular variation values.

9. A pattern recognition apparatus according to claim 8, wherein said pattern recognition means repeats said comparison operation by changing the combination of an input angular variation value and a reference angular variation value.

10. A pattern recognition apparatus according to claim 8, wherein said pattern recognition means uses the ratio of lengths of adjoining segments as elements of comparison in comparing an input angular variation value with a reference angular variation value.

11. A pattern recognition apparatus according to claim 8, wherein said pattern recognition means determines the direction and number of angular variations of said series of input angular variation values as a preprocessing of comparison of an input angular variation value and a reference angular variation value, and selects a reference pattern in said memorizing means having a same direction and number as those of said input angular variation value as a candidate pattern.

* * * * *